(12) United States Patent
Fee et al.

(10) Patent No.: US 8,183,727 B2
(45) Date of Patent: May 22, 2012

(54) GROUNDING MECHANISM FOR ELECTRIC MOTOR

(75) Inventors: David M. Fee, Groveland, IL (US); Matthew A. Gregait, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 405 days.

(21) Appl. No.: 12/313,711

(22) Filed: Nov. 24, 2008

(65) Prior Publication Data
US 2010/0127585 A1 May 27, 2010

(51) Int. Cl.
*H02K 11/00* (2006.01)
*F16J 15/447* (2006.01)
(52) U.S. Cl. ............ 310/71; 310/90; 361/121; 361/220
(58) Field of Classification Search ................ 310/67 R, 310/71, 90; 361/212, 220; 384/476; 439/92
See application file for complete search history.

(56) References Cited

U.S. PATENT DOCUMENTS

| | | | |
|---|---|---|---|
| 4,515,417 A | 5/1985 | Shiraishi | |
| 5,119,257 A | 6/1992 | Itou et al. | |
| 5,139,425 A | 8/1992 | Daviet et al. | |
| 5,442,506 A | 8/1995 | Kang | |
| 5,454,724 A | 10/1995 | Kloeppel et al. | |
| 5,729,404 A * | 3/1998 | Dunfield et al. | 360/99.08 |
| 5,804,903 A | 9/1998 | Fisher et al. | |
| 5,914,547 A | 6/1999 | Barahia et al. | |
| 6,819,018 B2 | 11/2004 | Melfi | |
| 2002/0121821 A1 | 9/2002 | Ritter | |
| 2007/0040459 A1 | 2/2007 | Oh | |
| 2007/0138748 A1 | 6/2007 | Orlowski et al. | |
| 2010/0127585 A1* | 5/2010 | Fee et al. | 310/71 |

* cited by examiner

*Primary Examiner* — Quyen Leung
*Assistant Examiner* — David Scheuermann
(74) *Attorney, Agent, or Firm* — Liel & McNeil

(57) ABSTRACT

An electric motor such as an AC induction electric motor includes a rotor having a rotor core and a rotor shaft. The rotor shaft defines an axially extending bore which has an electrical grounding ring positioned therein. The electrical grounding ring has an inertia insensitive configuration and forms a relatively low resistance electrical circuit segment between the rotor shaft and an electric motor housing to ground the electric motor rotor. The electric motor includes an oil lubricated bearing for the rotor shaft, and a sealing member such as a lip seal is positioned within the axially extending bore to inhibit lubricating oil intrusion therein. A non-rotating stub shaft may be mounted in the housing and extends into the axially extending bore to fluidly seal with the sealing member and electrically connect with the electrical grounding ring, which is fixed to rotate with the rotor shaft.

19 Claims, 2 Drawing Sheets

GROUNDING MECHANISM FOR ELECTRIC MOTOR

TECHNICAL FIELD

The present disclosure relates generally to electric motors and electric motor components, and relates more particularly to grounding an electric motor rotor via an electrical grounding ring recessed within a bore in a rotor shaft and rotatable therewith.

BACKGROUND

It is common to use a grounding device for rotating shafts in electric motor rotors and other rotary electric machines. Grounding rings or other grounding devices are used to dissipate excess current. If the current is not provided a grounding path, it can arc across rolling element bearings and hasten corrosion, reducing bearing life. In a typical strategy, grounding devices such as grounding rings are used in a fixed housing which prevents rotation of the grounding device. Bristles or other contact elements of the fixed grounding device may then ride on a rotating rotor shaft to provide an electrical ground circuit path for excess current. Electrical current may preferentially flow through the grounding device rather than the bearings, thus preventing or reducing bearing corrosion.

One electrical grounding mechanism is known from U.S. Pat. No. 4,515,417 to Shiraishi. Shiraishi provides a grounding device for preventing electrolytic corrosion in the bearings of a rotary electric machine. The grounding device has a centrifugal contact point between an electrically conductive end cover and an inner surface of a rotor shaft. The contact point includes a spring biased contact element which extends inwardly in the rotor shaft and contacts a portion of the end cover which extends therein. When the rotor is stationary or rotating at low speeds, the contact element maintains electrical contact between the rotor shaft and the end cover. As the rotor speed increases, however, inertia will tend to move the contact element radially outward against the spring bias such that it ceases to provide electrical contact between the rotating rotor shaft and the end cover. A grease lubricated bearing is positioned about and rotatably journals the rotor shaft in Shiraishi. Ostensibly, the electrical resistance of the grease lubricated bearing increases with rotor speed, such that grounding is not needed at relatively higher rotor speeds. Moving the contact element out of contact also purportedly reduces wear. Shiraishi may have application to specific rotor types in specific environments. The design, however, would be poorly suited to different rotor types having relatively lower speed ranges, as well as being poorly suited to designs wherein electrical resistance of rotor bearings does not change sufficiently with increased rotor speed to inhibit electrical currents arcing across the bearings.

SUMMARY

In one aspect, an electric motor includes a rotor having a rotor core and a rotor shaft whereupon the rotor core is mounted. The rotor shaft has a longitudinal shaft axis, an axial shaft end, and a cylindrical inner surface defining an axially extending bore having a bore opening located at the axial shaft end. A stator is positioned about the rotor and configured to connect with an electrical power supply for inducing a torque on the rotor. An electric motor housing is further provided and defines a bearing bore receiving the axial shaft end of the rotor shaft therein. A bearing is mounted on the rotor shaft adjacent the axial shaft end and positioned within the bearing bore to rotatably support the rotor shaft within the electric motor housing. The bearing forms a relatively high resistance electrical circuit segment between the rotor shaft and the electric motor housing. The electric motor further includes an electrical grounding mechanism including a grounding member mounted to the electric motor housing and extending into the axially extending bore, and an electrical grounding ring having an outer periphery contacting the cylindrical inner surface of the rotor shaft and an inner periphery contacting the grounding member. The electrical grounding ring has an inertia insensitive configuration and forms a relatively low resistance electrical circuit segment between the rotor shaft and the electric motor housing.

In another aspect, a rotor for an electric motor includes a rotor shaft defining a longitudinal shaft axis and having a first axial shaft end, a second axial shaft end and a bearing mounting interface adjacent the first axial shaft end. The rotor shaft further includes a cylindrical inner surface defining an axially extending bore having a bore opening located at the first axial shaft end. The rotor further includes a rotor core mounted on the rotor shaft between the first axial shaft end and the second axial shaft end. An electrical grounding ring is positioned within the axially extending bore and has an outer periphery which includes a cylindrical outer surface electrically connecting the grounding ring with the rotor shaft and an inner periphery which includes an electrical contact interface. The electrical grounding ring is fixed to rotate with the rotor via a press fit with the rotor shaft, the electrical grounding ring further having an inertia insensitive configuration adapted to maintain contact between the electrical contact interface and a non-rotating grounding member during rotation of the rotor.

In still another aspect, a method of making an electric motor includes assembling a rotor for the electric motor at least in part via mounting a rotor core between a first axial shaft end and a second axial shaft end of a rotor shaft having a cylindrical inner surface defining an axially extending bore which includes a bore opening located at the first axial shaft end. The method further includes establishing an electrical ground circuit segment for the rotor at least in part via positioning an electrical grounding ring in the axially extending bore which includes an inertia insensitive configuration adapted to maintain contact between the electrical grounding ring and a non-rotating grounding member during rotor rotation. The method further includes positioning a sealing member within the axially extending bore at a location which is axially outward of the electrical grounding ring, the sealing member including an outer surface contacting the cylindrical inner surface of the rotor shaft and fluidly sealing therewith and an inner surface adapted to fluidly seal with the non-rotating grounding member during rotor rotation.

In still another aspect, a rotor assembly for an electric motor includes an electrical circuit segment configured to ground the electric motor, the electrical circuit segment includes a rotor shaft of a rotor for the electric motor, the rotor shaft defining a longitudinal axis and having an axial shaft end, a cylindrical outer surface with a bearing mounting interface configured for mounting an oil lubricated bearing thereon and a cylindrical inner surface defining an axially extending bore having a bore opening located at the axial shaft end. The electrical circuit segment further includes an electrical grounding ring fixed to rotate with the rotor shaft at an axially inward location within the axially extending bore and having an outer periphery which includes a cylindrical outer surface electrically connecting the grounding ring with the rotor shaft and an inner periphery which includes an electrical contact interface. The electrical grounding ring further includes an inertia insensitive configuration. The rotor assembly further includes a sealing member configured to inhibit intrusion of bearing lubricating oil into the axially extending bore, the sealing member being fixed to rotate with the rotor shaft at an axially outward location within the axially extending bore. The rotor assembly further includes a stub shaft coaxial with the rotor shaft and extending into the axially extending bore, the stub shaft being configured to electrically connect the electrical circuit segment with a housing for the electric motor. The stub shaft includes a first axial stub shaft segment contacting the electrical grounding ring and a second axial stub shaft segment contacting the sealing member.

In still another aspect, a grounding mechanism for an electric motor rotor includes a stub shaft defining a longitudinal axis and having a first axial end, a second axial end and a plurality of axial stub shaft segments including a mounting segment adjoining the first axial end which is adapted for press fitting within an electric motor housing, an electrical grounding segment adjoining the second axial end and a sealing segment extending between the mounting segment and the grounding segment. The mounting segment includes a first diameter, the grounding segment includes a second diameter greater than the first diameter and the sealing segment includes a third diameter greater than the first diameter and greater than the second diameter. The grounding mechanism further includes an electrical grounding ring positionable about the stub shaft and adapted to press fit within an axially extending bore defined by a rotor shaft of an electric motor. The electrical grounding ring includes an outer periphery having a cylindrical outer surface adapted to contact the rotor shaft within the axially extending bore, and an inner periphery including an electrical contact interface configured to electrically connect the electrical grounding ring with the stub shaft via contacting the stub shaft circumferentially about the grounding segment. The grounding mechanism still further includes a sealing member positionable about the stub shaft and also adapted to press fit within an axially extending bore defined by a rotor shaft of an electric motor. The sealing member includes a cylindrical outer surface and a sealing lip extending radially inwardly and configured to form a fluid seal with the stub shaft via contacting the stub shaft circumferentially about the sealing segment.

DETAILED DESCRIPTION

Figure 1:
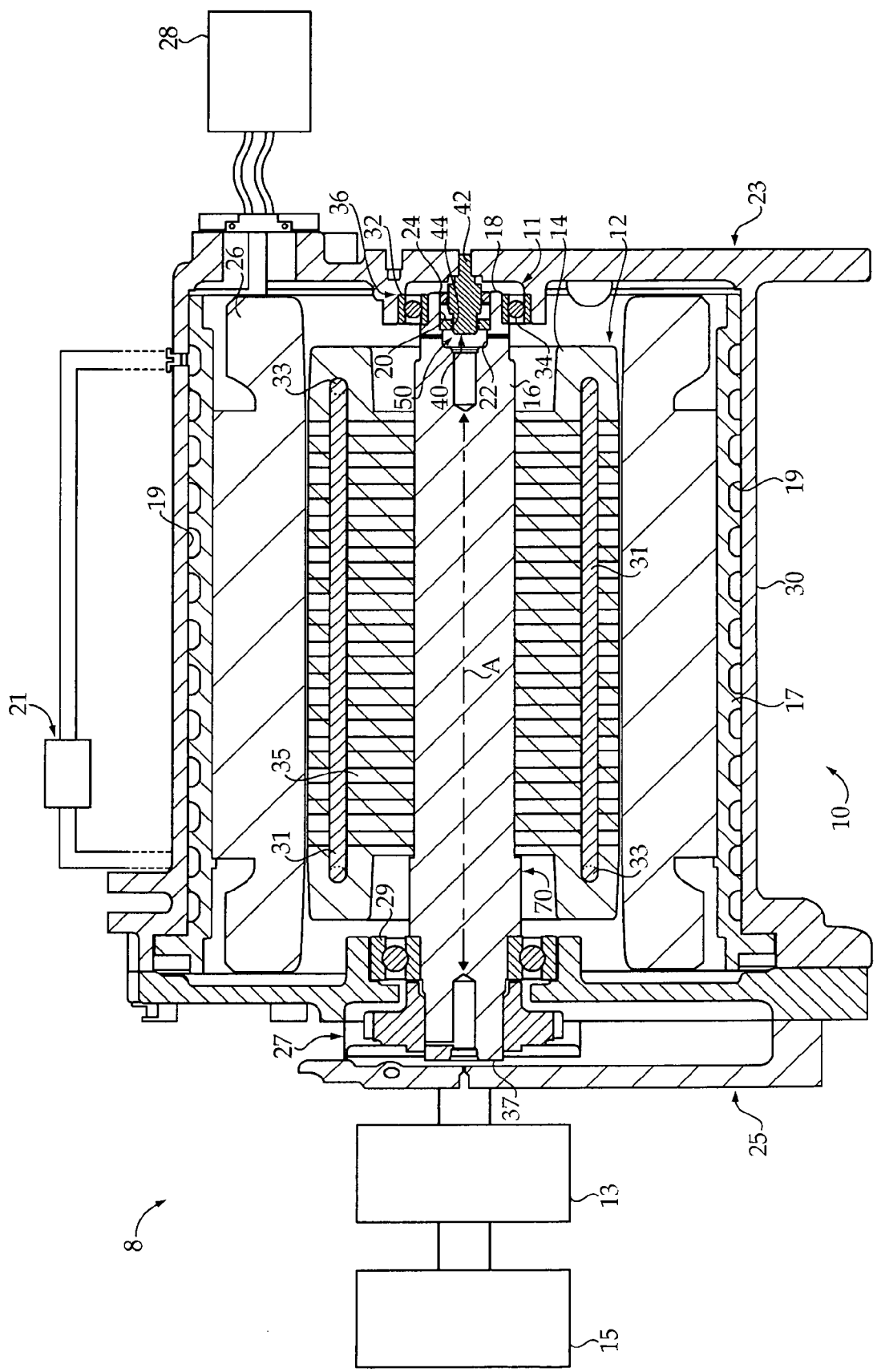
FIG. 1 is a partially sectioned side diagrammatic view of an electric motor propulsion system according to one embodiment.

Referring to FIG. 1, there is shown a propulsion system 8 which includes an electric motor 10 according to one embodiment. Electric motor 10 may be an AC induction electric motor, including a rotor 12 having an AC induction rotor core 14 and a rotor shaft 16 having AC induction rotor core 14 mounted thereon. In other embodiments, a permanent magnet electric motor such as a switched reluctance motor might be used. Rotor shaft 16 may include a longitudinal shaft axis A, a first axial shaft end 18 and a second axial shaft end 37. AC induction rotor core 14 may be mounted circumferentially about rotor shaft 16, in contact with a cylindrical outer rotor shaft surface 70, between first axial shaft end 18 and second axial shaft end 37. Rotor shaft 16 may further include a cylindrical inner surface 20 defining an axially extending bore 22 having a bore opening 24 located at first axial shaft end 18. In one embodiment AC induction rotor core 14 may be of a type having a set of longitudinally extending conductive rods 31, which connect with conductive rings 33 at ends of conductive rods 31. A plurality of laminations 35 may be positioned adjacent one another along an axial length of rotor core 14. Rods 31 and rings 33 may be a uniform molded structure formed, for example, via injecting molten aluminum into bores, etc, defined by laminations 35. Laminations 35 may include iron, for example. A stator 26 may be positioned about rotor 12 and configured to connect with an electrical power supply 28 for inducing a torque on rotor 12. An electric motor housing 30 may be positioned about rotor 12, and other components of electric motor 10. In one embodiment, electric motor housing 30 may include a first housing end 23 and a second housing end 25. A cooling jacket 17 may be positioned about stator 26, for instance having stator 26 press fit therein, and may define one or more cooling fluid passages 19 with electric motor housing 30. A cooling system 21 may be provided for transitioning a cooling liquid through passages 19 to dissipate heat generated during operation of electric motor 10. In other embodiments, rotor 12 or other components of electric motor 10 may be used in a different application, such as an air cooled application, etc.

A drive coupling 27 may be connected with rotor shaft 16 adjacent second axial end 37. In one embodiment, drive coupling 27 may connect with a transmission 13 which in turn connects with a load 15. Electrical power supply 28 may be used to energize stator 26, and in turn induce a torque on rotor 12. Inducing a torque on rotor 12, which takes place generally in a known manner, causes rotor 12 to rotate within electric motor housing 30, and in turn transfers torque via drive coupling 27 and transmission 13 to load 15. In one embodiment, electric motor 10 may be used as a propulsion motor in an electric drive machine such as a track-type tractor, a wheel loader, an on-highway machine, etc. In still other embodiments, rather than use in a propulsion system 8 for mobile machinery, electric motor 10 might be a stationary device used for providing rotational power in a factory setting or the like.

Figure 2:
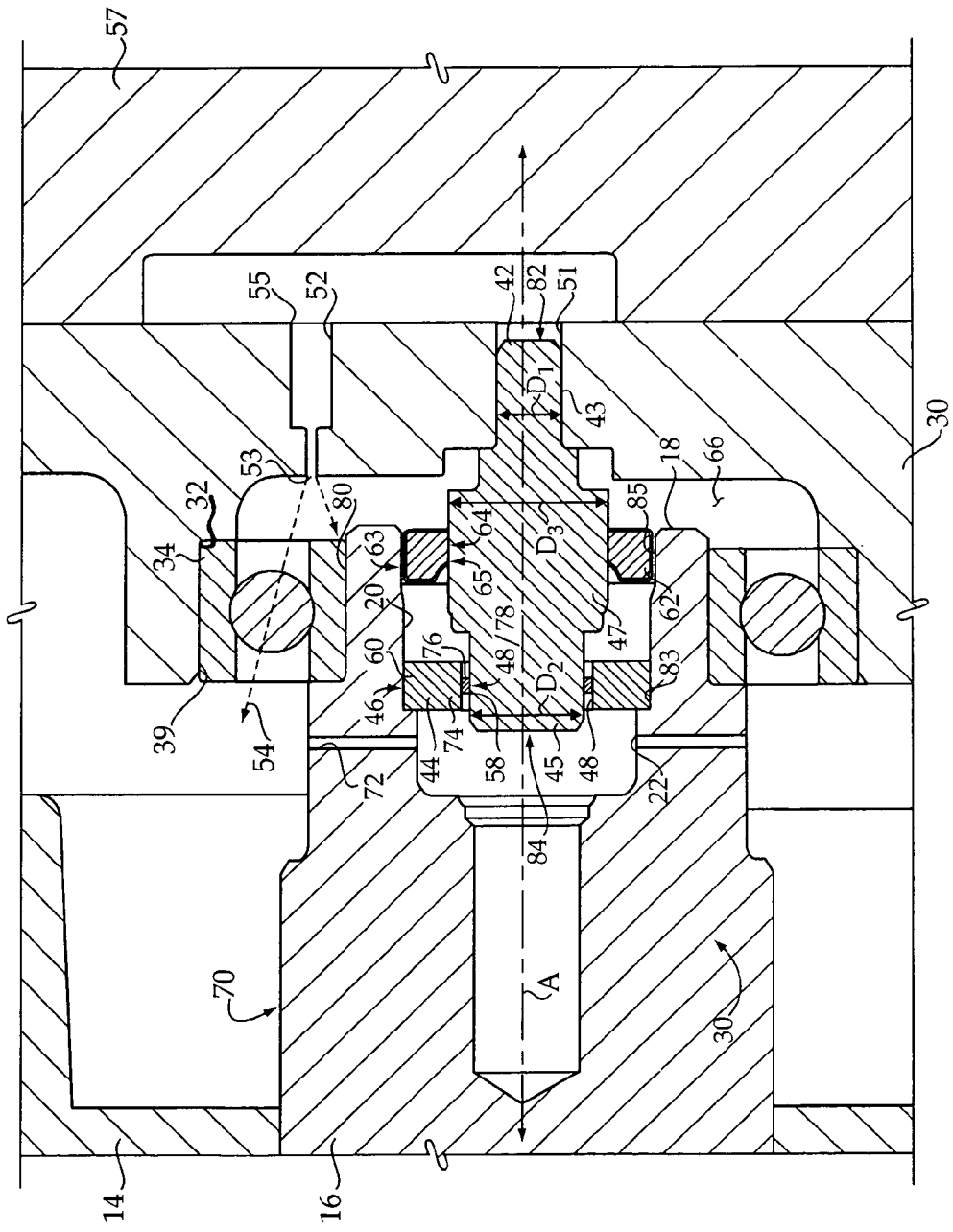
FIG. 2 is an enlarged partial view of the system shown in FIG. 1.

Electric motor housing 30 may define a bearing bore 32 which receives a first bearing 34 mounted on rotor shaft 16 by way of a bearing mounting interface 80 located adjacent axial shaft end 18. First bearing 34 rotatably supports rotor shaft 16 adjacent axial shaft end 18. Bearing mounting interface 80 may include a reduced diameter portion of rotor shaft 16. A second bearing 29 may be received in electric motor housing 30 and rotatably supports rotor shaft 16 adjacent second axial shaft end 37. Bearing bore 32 thus receives axial shaft end 18. Bearing 34 may form a relatively high resistance electrical circuit segment 36 between rotor shaft 16 and electric motor housing 30. In one embodiment, bearing 34 as well as bearing 29 may be oil lubricated. Referring also to FIG. 2, electric motor housing 30 may define an oil supply orifice 52 having a first orifice end or orifice inlet 53 and a second orifice end or orifice outlet 55 located in an oil cavity 66, which communicates with bearing bore 32. An end cover 57 may be coupled with electric motor housing 30 and configured to supply lubricating oil from a motor lubrication system (not shown) to oil supply orifice 52 at a pressure. Oil supplied via oil supply orifice 52 may spray in an axially inward direction across oil cavity 66 which is defined in part by electric motor housing 30, and thenceforth pass generally axially through bearing 34. An approximate oil spray path defined by orifice 52 is identified in FIG. 2 via reference numeral 54. It may be noted that oil spray path 54 passes through bearing 34, although a portion of lubricating oil supplied via orifice 52 may also accumulate within oil cavity 66 and thenceforth flow through bearing 34.

Electric motor 10 may further include an electrical grounding mechanism 40 which includes a grounding member 42 mounted to electric motor housing 30 and electrically connected therewith. Grounding member 42 may include a first axial end 82 and a second axial end 84, and may extend into axially extending bore 22 such that grounding member 42 is coaxial with rotor shaft 16. In one embodiment, electric motor housing 30 may define a bore 51 which receives one of a plurality of axial segments of grounding member 42. In particular, a first axial segment or mounting segment 43 of grounding member 42 adjoins first axial end 82 and may be received within bore 51 via a press fit. Grounding member 42 may include a second axial segment or electrical grounding segment 45 which adjoins second axial end 84. Grounding member 42 may also include a third axial segment or sealing segment 47 which extends between grounding segment 45 and mounting segment 43. In one embodiment, mounting segment 43 may include a first diameter $D_1$, grounding segment 45 may include a second diameter $D_2$ which is greater than first diameter $D_1$ and sealing segment 47 may include a third diameter $D_3$ which is greater than first diameter $D_1$ and also greater than second diameter $D_2$. Grounding member 42 may further include a cylindrical outer surface 56, and may be a stub shaft in one embodiment. The use of a stub shaft having different diameters on a plurality of axial stub shaft segments as shown and described herein facilitates grounding member 42 serving multiple functions, as will be further apparent from the following description. Grounding member 42 may be fixed relative to rotor shaft 16, in other words grounding member 42 may remain stationary as rotor shaft 16 and components mounted thereon and therein rotate about grounding member 42.

Grounding mechanism 40 may further include an electrical grounding ring 44 positioned at an axially inward location within axially extending bore 22 and coaxial with rotor shaft 16. Grounding member 42 is configured to electrically connect electrical grounding ring 44 with housing 30. In one embodiment, electrical grounding ring 44 may include an outer periphery 46 which includes a cylindrical outer surface 60 contacting cylindrical inner surface 20 of rotor shaft 16 and press fit therewith. Contact between cylindrical outer surface 60 and cylindrical inner surface 20 electrically connects electrical grounding ring 44 with rotor shaft 16. Electrical grounding ring 44 may further include a radially outward portion 74 whereupon cylindrical outer surface 60 is located, and a radially inward portion 76 which includes an inner periphery 48 having a cylindrical electrical contact interface 58 circumferentially contacting grounding segment 45 of grounding member 42. As used herein, the term "circumferentially" should be understood to mean simultaneous contact or connection about substantially an entire circumference. A press fit between electrical grounding ring 44 and rotor shaft 16 fixes electrical grounding ring 44 to rotate with rotor shaft 16 about grounding member 42. Electrical contact interface 58 establishes and maintains electrical contact between electrical grounding ring 44 and grounding member 42 such that electrical grounding ring 44 forms a relatively low resistance electrical circuit segment 50 between rotor shaft 16 and electric motor housing 30. Low resistance electrical circuit segment 50 provides a path for electrical current from rotor core 14 to electric motor housing 30 which is followed in preference to high resistance electrical circuit segment 36, reducing or eliminating corrosion of bearing 34. Rotor shaft 16 may also be considered a part of electrical circuit segment 50, and electrically connects with rotor core 14. In one embodiment, radially outward portion 74 may include a first electrically conductive material and radially inward portion 76 may include a second electrically conductive material which is different from the first electrically conductive material. In one further embodiment, radially outward portion 74 may include a metallic material and radially inward portion 76 may include a carbon fiber material. Suitable electrical grounding rings are available commercially from Electro Static Technology, of Mechanic Falls, Me. It may further be noted from the illustration of FIG. 2 that radially outward portion 74 may include a first axial thickness, and radially inward portion 76 may include a second axial thickness which is less than the first axial thickness.

As mentioned above, lubricating oil from orifice 52 may spray into and to a certain extent accumulate within cavity 66. It has been discovered that intruding oil can interfere with electrical contact between electrical contact interface 58 and cylindrical outer surface 56 of grounding member 42. As described herein, intrusion of lubricating oil into bore 22 may be inhibited in electric motor rotors according to the present disclosure. In one embodiment, axially extending bore 22 may include an axially inward bore segment 83 having a first radial diameter and an axially outward bore segment 85 having a second, relatively larger radial diameter. As used herein, the term "radial" refers to a direction normal to an axial direction aligned with axis A. The different diameters of bore segments 83 and 85 facilitates press fitting multiple components into axially extending bore 22, and also allows the use of off the shelf components as further described herein. Electrical grounding ring 44 may be press fit within axially extending bore 22 at an axially inward location, and in particular press fit with bore segment 83. Electrical grounding mechanism 40 may further include a sealing member 62 having a cylindrical outer surface 63 and being press fit with inner surface 20 within axially outward bore segment 85 of axially extending bore 22. A press fit between sealing member 62 and bore segment 85 fixes sealing member 62 to rotate with rotor shaft 16 at an axially outward location within axially extending bore 22. Sealing member 62 may include a lip seal having a sealing lip 65 which extends radially inwardly and contacts cylindrical outer surface 56 of grounding member 42 within sealing segment 47 to form a rotating fluid seal 64 therewith when grounding member 42 is positioned within axially extending bore 22. Sealing member 62 can thus inhibit intrusion of lubricating oil into axially extending bore 22 which might otherwise interfere with electrical contact between electrical grounding ring 44 and grounding member 42, or otherwise electrically disrupt low resistance electrical circuit segment 50. In one embodiment, sealing member 62 may be positioned just within bore segment 85 such that an axially outward side of sealing member 62 is aligned with bore opening 24. In other embodiments, a different arrangement of the parts might be used.

As alluded to above, certain earlier designs such as Shiraishi are applicable only to certain rotor types, in certain rotor operating strategies or in certain electric motor applications. Shiraishi indicates that the need for grounding his electric motor rotor is reduced at higher rotor speeds. Hence, electrical contact between Shiraishi's rotor and housing is interrupted as rotor speed increases above a certain level. In designs contemplated herein, however, oil lubricated bearings and other rotor and electric motor features make continuous electrical grounding desirable. Accordingly, electric motor rotors according to the present disclosure may include electrical grounding rings 44 having an inertia insensitive configuration such that an electrical connection between grounding ring 44 and grounding member 42 is continuously maintained during operation of electric motor 10. As used herein, the term "inertia insensitive configuration" is intended to mean that the shape, orientation, mechanical configuration or electrical conductivity properties of electrical grounding ring 44 do not change substantially in response to inertia experienced by rotating. In contrast to earlier designs wherein a movable or otherwise re-configurable grounding mechanism is used, rotating rotor 12 through its operating speed range will not tend to change the configuration of electrical grounding ring 44 and, hence, will not interrupt electrical grounding of rotor 12 via electrical circuit segment 50.

INDUSTRIAL APPLICABILITY

Making electric motor 10 may include assembling rotor 12 at least in part via mounting AC induction rotor core 14 on rotor shaft 16 between first axial shaft end 18 and second axial shaft end 37. Making AC induction electric motor 10 may further include establishing electrical ground circuit segment 50 for grounding rotor 12 at least in part via positioning electrical grounding ring 44 in axially extending bore 22. Once electrical grounding ring 44 is positioned at an axially inward location within axially extending bore 22, such as by way of a press fit therein, sealing member 62 may be positioned within axially extending bore 22 at a location which is axially outward of electrical grounding ring 44, also by way of a press fit. Sealing member 62 may seal between outer surface 63 and inner surface 20 within axially outward bore segment 85. In one practical implementation strategy, electrical grounding ring 44 and sealing member 62 may be each positioned appropriately within axially extending bore 22, and then the assembled rotor core 14 and rotor shaft 16 may have bearings 34 and 29 positioned thereon adjacent axial shaft end 18 and axial shaft end 37, respectively. With bearing 34 positioned on bearing mounting interface 80, rotor shaft 16 may be lowered under the force of gravity or otherwise received within bearing bore 32, such that bearing 34 is pressed therein via the weight of rotor 12, for example. Bearing bore 32 may be chamfered at an axially inward end to facilitate receiving axial shaft end 18 and bearing 34 therein.

In one embodiment, bearing bore 32 and oil cavity 66 and grounding member 42 may all be coaxial. Grounding member 42 may be press fit within bore 51 prior to coupling rotor 12 with electric motor housing 30. Accordingly, when rotor 12 is received within electric motor housing 30 via pressing or otherwise positioning bearing 34 in bearing bore 32, an interaction between bearing bore 32 and bearing 34 may be used to coaxially locate rotor shaft 16 with grounding member 42. Locating rotor shaft 16 coaxially with grounding member 42 facilitates establishing electrical contact between electrical grounding ring 44 and grounding member 42 and establishing fluid seal 64 in a single assembly step. As mentioned above, the different diameters of axial segments 43, 45 and 47 facilitate grounding member 42 serving multiple functions. During assembly of grounding member 42 with housing 30, the relatively smaller diameter $D_1$ allows grounding member 42 to be pressed to a predefined axial location such that axial segments 45 and 47 will be properly positioned for interaction with grounding member 44 and sealing member 62. The relative difference between diameters $D_2$ and $D_3$ allows axial segment 45 to freely pass through sealing member 62 as grounding member 42 enters axially extending bore 22. The difference between diameters $D_2$ and $D_1$ also facilitates the use of off the shelf parts for electrical grounding ring 44 and sealing member 62. With grounding member 42 positioned within axially extending bore 42, electrical contact is established between electrical grounding ring 44 and grounding segment 45, and sealing contact is established between sealing member 62 and sealing segment 47. Rotor shaft 16 may further define at least one vent bore 72 communicating between axially extending bore 22 and cylindrical outer surface 70. Vent bore 72 serves dual functions of venting air from bore 22 which is displaced by grounding member 42 during assembly, and also facilitating draining or inertial expulsion of any oil which manages to enter bore 22. Vent bore 72 may be located axially inward of electrical grounding ring 44.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent from an examination of the attached drawings and appended claims.

What is claimed is:

1. An electric motor comprising:
    a rotor including a rotor core and a rotor shaft having the rotor core mounted thereon, the rotor shaft having a longitudinal shaft axis, an axial shaft end, an outer surface, and a cylindrical inner surface defining an axially extending bore having a bore opening located at the axial shaft end;
    a stator positioned about the rotor and configured to connect with an electrical power supply for inducing a torque on the rotor;
    an electric motor housing defining a bearing bore receiving the axial shaft end of the rotor shaft therein;
    a bearing mounted on the rotor shaft adjacent the axial shaft end and positioned within the bearing bore such that the rotor shaft and rotor core are rotatable within the electric motor housing in response to the induced torque, the bearing forming a relatively high resistance electrical circuit segment between the rotor shaft and the electric motor housing; and
    an electrical grounding mechanism including a grounding member mounted to the electric motor housing and extending into the axially extending bore, and an electrical grounding ring having an outer periphery contacting the cylindrical inner surface of the rotor shaft and an inner periphery contacting the grounding member, the electrical grounding ring having an inertia insensitive configuration and forming a relatively low resistance electrical circuit segment between the rotor shaft and the electric motor housing;
    wherein the electric motor housing includes a lubricating oil supply orifice formed therein and defining an oil spray path passing through the bearing.

2. The electric motor of claim 1 wherein the grounding member includes a stub shaft having a cylindrical outer surface and being coaxial with the rotor shaft, and wherein the electrical grounding ring is fixed to rotate with the rotor about the stub shaft and includes an electrical contact interface located on the inner periphery and contacting the cylindrical outer surface of the stub shaft.

3. The electric motor of claim 2 wherein the outer periphery of the electrical grounding ring includes a cylindrical outer surface press fit with the cylindrical inner surface of the rotor shaft at an axially inward position within the axially extending bore, and further comprising a sealing member forming a fluid seal between the stub shaft and the rotor shaft at an axially outward position within the axially extending bore.

4. The electric motor of claim 3 wherein the sealing member includes a lip seal fixed to rotate with the rotor about the stub shaft via a press fit with the rotor shaft and having a lip in sealing contact with the cylindrical outer surface of the stub shaft.

5. The electric motor of claim 4 wherein the electric motor housing further defines an oil cavity communicating with the bearing bore and coaxial with the bearing bore, wherein the lubricating oil supply orifice includes an orifice outlet located in the oil cavity, and wherein the oil spray path extends in an axial direction from the orifice outlet across the oil cavity and axially through the bearing.

6. The electric motor of claim 1 wherein the rotor shaft includes a cylindrical outer surface whereupon the rotor core is mounted and defines at least one vent bore communicating between the axially extending bore and the cylindrical outer surface of the rotor shaft.

7. An electric motor comprising:
a rotor including a rotor core and a rotor shaft having the rotor core mounted thereon, the rotor shaft having longitudinal shaft axis, an axial shaft end, an outer surface, and a cylindrical inner surface defining an axially extending bore having a bore opening located at the axial shaft end;
a stator positioned about the rotor and configured to connect with an electrical power supply for inducing a torque on the rotor;
an electric motor housing defining a bearing bore receiving the axial shaft end of the rotor shaft therein;
a bearing mounted on the rotor shaft adjacent the axial shaft end and positioned within the bearing bore such that the rotor shaft and rotor core are rotatable within the electric motor housing in response to the induced torque, the bearing forming a relatively high resistance electrical circuit segment between the rotor shaft and the electric motor housing;
an electrical grounding mechanism including a grounding member mounted to the electric motor housing and extending into the axially extending bore, and an electrical grounding ring having an outer periphery contacting the cylindrical inner surface of the rotor shaft and an inner periphery contacting the grounding member, the electrical grounding ring having an inertia insensitive configuration and forming a relatively low resistance electrical circuit segment between the rotor shaft and the electric motor housing; and
a sealing member positioned within the axially extending bore at an axially outward location and fixed to rotate with the rotor shaft, wherein the electrical grounding ring is positioned within the axially extending bore at an axially inward position and is also fixed to rotate with the rotor shaft, and wherein the grounding member includes a non-rotating stub shaft having a plurality of axial segments including a mounting segment having a first diameter and being press fit within the electric motor housing, a grounding segment having a second diameter greater than the first diameter and contacting the inner periphery of the electrical grounding ring, and a sealing segment having a third diameter which is greater than the first diameter and greater than the second diameter and contacting the sealing member to form a fluid seal therewith.

8. The electric motor of claim 7 wherein the electrical grounding ring further comprises a radially outward portion that includes a first electrically conductive material and a cylindrical outer surface press fit with the cylindrical inner surface of the rotor shaft, and a radially inward portion that includes a second electrically conductive material different from the first electrically conductive material and having a cylindrical electrical contact interface contacting the non-rotating stub shaft.

9. A rotor for an electric motor comprising:
a rotor shaft defining a longitudinal shaft axis and having a first axial shaft end, a second axial shaft end and a bearing mounting interface adjacent the first axial shaft end, the rotor shaft further including a cylindrical inner surface defining an axially extending bore having a bore opening located at the first axial shaft end;
a rotor core mounted on the rotor shaft between the first axial shaft end and the second axial shaft end; and
an electrical grounding ring positioned within the axially extending bore and having an outer periphery which includes a cylindrical outer surface electrically connecting the grounding ring with the rotor shaft and an inner periphery which includes an electrical contact interface;
wherein the electrical grounding ring is fixed to rotate with the rotor via a press fit with the rotor shaft, the electrical grounding ring further having an inertia insensitive configuration adapted to maintain contact between the electrical contact interface and a non-rotating grounding member during rotation of the rotor.

10. The rotor of claim 9 wherein the electrical grounding ring includes a radially outward portion whereupon the cylindrical outer surface is located and including a first electrically conductive material, and a radially inward portion including a second electrically conductive material different from the first electrically conductive material, and wherein the electrical contact interface includes a cylindrical electrical contact interface located on the radially inward portion.

11. The rotor of claim 10 wherein the first electrically conductive material includes a metallic material, and wherein the second electrically conductive material includes a carbon fiber material.

12. The rotor of claim 10 further comprising a sealing member configured to inhibit lubricating oil intrusion into the axially extending bore when the non-rotating grounding member is positioned therein, the sealing member having a cylindrical outer surface and being press fit with the rotor shaft to fix the sealing member to rotate with the rotor shaft within the axially extending bore.

13. The rotor of claim 12 wherein the axially extending bore includes an axially inward bore segment having a first inner diameter adapted to interact via the corresponding press fit with the cylindrical outer surface of the grounding ring, and an axially outward bore segment having a second inner diameter greater than the first inner diameter and adapted to interact via the corresponding press fit with the sealing member, and wherein the rotor shaft further defines at least one vent bore connecting with the axially extending bore at a location which is axially inward of the electrical grounding ring.

14. The rotor of claim 10 wherein the electrical grounding ring is positioned at an axially inward location within the axially extending bore, and further comprising a lip seal positioned at an axially outward location within the axially extending bore and configured to inhibit lubricating oil intrusion therein.

15. A method of making an electric motor comprising:
assembling a rotor for the electric motor at least in part via mounting a rotor core between a first axial shaft end and a second axial shaft end of a rotor shaft, the rotor shaft having a longitudinal shaft axis, and a cylindrical inner surface defining an axially extending bore which includes a bore opening located at the first axial shaft end;

establishing an electrical ground circuit segment for the rotor at least in part via positioning an electrical grounding ring in the axially extending bore which includes an inertia insensitive configuration adapted to maintain contact between the electrical grounding ring and a non-rotating grounding member during rotor rotation; and positioning a sealing member within the axially extending bore at a location which is axially outward of the electrical grounding ring, the sealing member including an outer surface contacting the cylindrical inner surface of the rotor shaft and fluidly sealing therewith and an inner surface adapted to fluidly seal with the non-rotating grounding member during rotor rotation;

wherein assembling the rotor further includes mounting the rotor core in contact with an outer surface of the rotor shaft such that the rotor core rotates with the rotor shaft during rotor rotation.

16. The method of claim 15 further comprising positioning a bearing on a bearing mounting interface of the rotor shaft adjacent the first axial shaft end, and receiving the first axial shaft end and the bearing within a bearing bore defined by an electric motor housing; and wherein receiving the first axial shaft end and the bearing within the bearing bore further includes positioning the bearing in a lubricating oil spray path defined by a lubricating oil supply orifice formed in the electric motor housing.

17. The method of claim 16 further comprising:

electrically connecting the electrical ground circuit segment with the electric motor housing at least in part via contacting a cylindrical electrical contact interface of the electrical grounding ring with a cylindrical outer surface of a non-rotating stub shaft press fit within the electric motor housing, during receiving the first axial shaft end; and forming a fluid seal between the sealing member and the non-rotating stub shaft to inhibit lubricating oil intrusion into the axially extending bore, during receiving the first axial shaft end.

18. A rotor assembly for an electric motor comprising:

an electrical circuit segment configured to ground the electric motor, the electrical circuit segment including a rotor shaft of a rotor for the electric motor, the rotor shaft defining a longitudinal axis and having an axial shaft end, a cylindrical outer surface with a bearing mounting interface configured for mounting an oil lubricated bearing thereon and a cylindrical inner surface defining an axially extending bore having a bore opening located at the axial shaft end;

the electrical circuit segment further including an electrical grounding ring fixed to rotate with the rotor shaft at an axially inward location within the axially extending bore and having an outer periphery which includes a cylindrical outer surface electrically connecting the grounding ring with the rotor shaft and an inner periphery which includes an electrical contact interface, the electrical grounding ring further having an inertia insensitive configuration;

a sealing member configured to inhibit intrusion of bearing lubricating oil into the axially extending bore, the sealing member being fixed to rotate with the rotor shaft at an axially outward location within the axially extending bore; and a stub shaft coaxial with the rotor shaft and extending into the axially extending bore, the stub shaft being configured to electrically connect the electrical circuit segment with a housing for the electric motor, the stub shaft having a first axial stub shaft segment contacting the electrical grounding ring and a second axial stub shaft segment contacting the sealing member.

19. A grounding mechanism for an electric motor rotor comprising:

a stub shaft defining a longitudinal axis and having a first axial end, a second axial end and a plurality of axial stub shaft segments including a mounting segment adjoining the first axial end which is adapted for press fitting within an electric motor housing, an electrical grounding segment adjoining the second axial end and a sealing segment extending between the mounting segment and the grounding segment, wherein the mounting segment includes a first diameter, the grounding segment includes a second diameter greater than the first diameter and the sealing segment includes a third diameter greater than the first diameter and greater than the second diameter;

an electrical grounding ring positionable about the stub shaft and adapted to press fit within an axially extending bore defined by a rotor shaft of an electric motor, the electrical grounding ring including an outer periphery having a cylindrical outer surface adapted to contact the rotor shaft within the axially extending bore, and an inner periphery including an electrical contact interface configured to electrically connect the electrically grounding ring with the stub shaft via contacting the stub shaft circumferentially about the grounding segment; and a sealing member positionable about the stub shaft and also adapted to press fit within an axially extending bore defined by a rotor shaft of an electric motor, the sealing member including a cylindrical outer surface, and a sealing lip extending radially inwardly and configured to form a fluid seal with the stub shaft via contacting the stub shaft circumferentially about the sealing segment.

* * * * *

UNITED STATES PATENT AND TRADEMARK OFFICE
CERTIFICATE OF CORRECTION

| | | |
|---|---|---|
| PATENT NO. | : 8,183,727 B2 | Page 1 of 1 |
| APPLICATION NO. | : 12/313711 | |
| DATED | : May 22, 2012 | |
| INVENTOR(S) | : Fee et al. | |

It is certified that error appears in the above-identified patent and that said Letters Patent is hereby corrected as shown below:

In the Claims,

Column 9, lines 20-21, in Claim 7, delete "having longitudinal shaft axis," and insert -- having a longitudinal shaft axis, --.

Signed and Sealed this
Eighteenth Day of August, 2015

Michelle K. Lee
*Director of the United States Patent and Trademark Office*